United States Patent
Hubrich et al.

(10) Patent No.: US 10,564,009 B2
(45) Date of Patent: Feb. 18, 2020

(54) POSITION SENSOR, POSITION MEASURING DEVICE AND METHOD FOR THE OPERATION THEREOF

(71) Applicant: Horst Siedle GmbH & Co. KG, Furtwangen (DE)

(72) Inventors: Stefan Hubrich, Filderstadt (DE); Peter Dingler, Aalen-Ebnat (DE); Berkan Oeguet, Stuttgart (DE); Joachim Schnell, Weilheim/Teck (DE)

(73) Assignee: HORST SIEDLE GMBH & CO. KG, Furtwangen (DE)

( * ) Notice: Subject to any disclaimer, the term of this patent is extended or adjusted under 35 U.S.C. 154(b) by 107 days.

(21) Appl. No.: 15/515,179

(22) PCT Filed: Sep. 10, 2015

(86) PCT No.: PCT/EP2015/070719
§ 371 (c)(1),
(2) Date: Mar. 29, 2017

(87) PCT Pub. No.: WO2016/066313
PCT Pub. Date: May 6, 2016

(65) Prior Publication Data
US 2017/0241809 A1    Aug. 24, 2017

(30) Foreign Application Priority Data
Oct. 28, 2014   (DE) .................. 10 2014 221 967

(51) Int. Cl.
*G01B 7/14*   (2006.01)
*G01D 5/12*   (2006.01)
*G01D 5/20*   (2006.01)

(52) U.S. Cl.
CPC .................. *G01D 5/2073* (2013.01)

(58) Field of Classification Search
CPC .... G01D 5/204; G01D 5/2073; G01D 5/2026; G01D 5/2053; G01D 5/2046
See application file for complete search history.

(56) References Cited

U.S. PATENT DOCUMENTS 5,815,091 A * 9/1998 Dames .................. G01D 5/2073
                                                      324/207.17
6,011,389 A * 1/2000 Masreliez ............ G01D 5/2046
                                                      324/207.17

(Continued)

FOREIGN PATENT DOCUMENTS

CN    1071504 A    4/1993
CN    1157910 A    8/1997

(Continued)

OTHER PUBLICATIONS

European Search Report dated Jun. 5, 2018.
(Continued)

*Primary Examiner* — Minh N Tang
(74) *Attorney, Agent, or Firm* — Harness, Dickey & Pierce, P.L.C.

(57) ABSTRACT

A position signal generator for an electronic position measuring device is disclosed. In an embodiment, the position signal generator includes a signal generation device for generating a periodic magnetic signal, and an electric power supply device for supplying the signal generation device with electric energy. The position of the position signal generator is determined via the position measuring device.

9 Claims, 8 Drawing Sheets

(56) References Cited

U.S. PATENT DOCUMENTS

| | | | |
|---|---|---|---|
| 7,705,585 B2* | 4/2010 | Howard | G01D 5/2053 324/207.17 |
| 2004/0227644 A1* | 11/2004 | Lin | G01D 5/2073 340/870.3 |

FOREIGN PATENT DOCUMENTS

| | | |
|---|---|---|
| CN | 1336552 A | 2/2002 |
| CN | 1085332 C | 5/2002 |
| CN | 1470847 A | 1/2004 |
| DE | 69502283 T2 | 11/1998 |
| DE | 19855685 A1 | 6/1999 |
| DE | 102007-017549 A1 | 4/2008 |
| EP | 0658745 A2 | 6/1995 |
| EP | 0743508 A2 | 11/1996 |
| EP | 1442273 B1 | 10/2006 |
| GB | 2374424 B | 5/2003 |
| JP | H8313295 A | 11/1996 |
| JP | H10500481 A | 1/1998 |
| JP | 2009168701 A | 7/2009 |
| KR | 101252473 B1 | 4/2013 |

OTHER PUBLICATIONS

International Search Report PCT/ISA/210 for International Application No. PCT/EP2015/070719 dated Mar. 29, 2016.

Written Opinion of the International Searching Authority PCT/ISA/237 for International Application No. PCT/EP2015/070719 dated Mar. 29, 2016.

Japanese Office Action and English translation thereof dated Jan. 15, 2019.

Chinese Office Action and English translation thereof dated Jan. 3, 2019.

Office Action for Canadian Patent Application No. 2,965,008 dated May 31, 2019.

* cited by examiner

POSITION SENSOR, POSITION MEASURING DEVICE AND METHOD FOR THE OPERATION THEREOF

PRIORITY STATEMENT

This application is the national phase under 35 U.S.C. § 371 of PCT International Application No. PCT/EP2015/070719 which has an International filing date of Sep. 10, 2015, which designated the United States of America and which claims priority to German patent application number DE 10 2014 221 967.1 filed Oct. 28, 2014, the entire contents of which are hereby incorporated herein by reference.

FIELD

An embodiment of invention relates to a position signal generator for an electronic position measuring device. An embodiment of the invention also relates to an electronic position measuring device.

An embodiment of invention furthermore relates to a method for operating such a position signal generator and to a method for operating such a position measuring device.

BACKGROUND

Known from the EP 1 442 273 B1 is a sensing device for the position measuring which is embodied for use as a passive position signal generator. The passive position signal generator comprises a resonant circuit, excited by a signal transmitted from the conventional sensing device, the output signal of which can be coupled into receiving coils of the known sensing device. The conventional sensing device has a relatively low dynamic and a relatively low resolution for the position measurement.

SUMMARY

An embodiment of the present invention is to provide an improved position signal generator and an improved position measuring device, as well as correspondingly improved methods for operating these.

The position signal generator according to an embodiment of the invention comprises a signal generation device for generating a periodic magnetic signal and an electric power supply device for supplying the signal generation device with electric power, thus representing an active position signal generator—as opposed to the initially mentioned conventional system. The active position signal generator according to the invention advantageously allows the generating of relatively strong magnetic signals to be coupled into one or several measuring loops of a position measuring device, as a result of which interfering influences present in real system, for example interfering radiation or noise, have a reduced influence as compared to conventional systems, wherein this has an advantageous effect on the sensitivity of the position measurement and permits a higher position resolution In particular, the principle according to the invention advantageously allows avoiding signal overcouplings as can occur with conventional systems.

The configuration according to an embodiment of the invention in the same way achieves a higher dynamic for a total system comprising the position signal generator, so that detecting a position is possible faster than with conventional systems, thereby making it possible to realize a higher detection rate.

According to one preferred embodiment, the electric power supply is provided with at least one, preferably local, energy storage. A capacitor is advantageously used for this energy storage. Alternatively or in addition, one or several batteries and/or accumulators can also be provided, wherein at least one energy storage is advantageously arranged locally on the position signal generator, so that it is moved along with the signal generator.

According to another preferred embodiment, the energy storage of the electric power supply system is arranged locally on the position signal generator (thus can be moved along with it) and is embodied to store electric energy in the form of a direct voltage. This is conceivable for the use of capacitors as well as batteries and/or accumulators.

With a different embodiment, the energy storage is provided with at least one capacitor having a capacity of 1 nF (nano-Farad) or more, in particular 10 nF or more, furthermore especially 100 nF or more.

The energy storage of another preferred embodiment comprises at least one accumulator or a battery with a capacity of 10 mAh (milliampere hours) or more, in particular 100 mAh or more, furthermore in particular 500 mAh or more.

With other embodiments, however, it is possible to consider not connecting the energy storage locally on and/or in the position signal generator, but to connect it via an electrical line, e.g. of the type of trailing cables and/or a sliding contact, thus reducing the mass of the position signal generator itself.

The electric power supply device of another advantageous embodiment comprises at least one energy converter, designed to convert mechanical energy and/or thermal energy and/or radiation energy and/or energy tapped from a magnetic or electric field into electric energy (and/or into chemical energy, for example in the case of batteries or accumulators), thus providing multiple options for supplying energy to the active position signal generator. According to one embodiment, in particular, the principle of "energy harvesting" can also be used, wherein the position signal generator draws the energy needed for its operation from the environment, for example especially from already existing electromagnetic fields, solar radiation, ambient light, mechanical vibrations of a target system containing the position signal generator, and the like.

An inductive supply of the position signal generator with electric power is particularly advantageous according to one embodiment, wherein a position measuring device assigned to the position signal generator is provided, for example, with at least one corresponding induction coil for generating an induction field. With this embodiment, the position signal generator comprises at least one receiving coil for absorbing the energy from the induction field, and the voltage induced in the receiving coil can be used for charging the energy storage (in this case preferably local) of the position signal generator. It is particularly advantageous to embody the energy converter for the position signal generator according to one embodiment, such that it draws energy from an induction field with a frequency of approximately 1 MHz to approximately 4 MHz.

The electric power supply device of another preferred embodiment is provided with at least one rectifier for charging up the energy storage, in particular using a direct voltage. In that case, the direct voltage generated by the rectifier is used for charging the energy storage. The energy, for example drawn from the previously described induction field with a frequency of approximately 1 MHz to approximately 4 MHz, can then be rectified locally on the position signal generator and can be used for charging an energy storage, also arranged locally on the position signal generator, such as an accumulator or a capacitor.

According to a further advantageous embodiment, the signal generation device is provided with at least one, preferably active, oscillator. The option is thus advantageously provided to actively generate in the position signal generator the periodic magnetic signal, which can be used with an associated position measuring device for detecting the position of the position signal generator. For example, a magnetic coil provided as transmitter for the signal generation device can be admitted directly with the output signal from the oscillator. Alternatively, the output signal from the oscillator can initially be amplified, and the magnetic coil then admitted with the amplified output signal from the oscillator to generate the periodic magnetic signal. For the present case, an "active" oscillator is understood to be an oscillator that is supplied with power in the form of an electric direct voltage as input voltage and which actively generates an alternating voltage signal as output signal.

The signal generation device of a different embodiment can also be provided with several magnetic coils.

A further advantageous embodiment provides that the periodic magnetic signal has a frequency component in the range of approximately 1 kHz (kilohertz) to approximately 200 kHz, in particular ranging from approximately 10 kHz to approximately 20 kHz. The periodic signal generated by the position signal generator and/or its signal generation device preferably has precisely one frequency component in the aforementioned frequency range, thus making possible an extremely precise position measuring. Providing signals in the kHz range also permits a particularly easy and efficient evaluation as compared to known systems, which operate using higher frequencies.

The position measuring device according to an embodiment of the invention is intended for detecting a position of a position signal generator that is moved along a measuring path, wherein the position signal generator preferably is embodied according to the present invention. The position measuring device according to the invention is provided with at least one first conductor loop, arranged along the measuring path, for detecting a magnetic signal generated by the position signal generator, wherein the first conductor loop is embodied such that a magnetic coupling between one and/or the signal generation device of the position signal generator and the first conductor loop changes in dependence on the position of the position signal generator. The position measuring device according to the invention is furthermore provided with an evaluation unit, designed to detect the position in dependence on a first (electric) signal that is generated by the magnetic signal in the first conductor loop.

The use of the active position signal generator according to the invention for the position measuring device according to the invention has the advantage that the first signal generated in the first conductor loop has a relatively large amplitude, which results in a reduced impact on the measuring result by the initially already described interfering effects.

A different advantageous embodiment provides for a second conductor loop, arranged at least in some sections along the measuring path, for detecting the magnetic signal generated by the position signal generator, wherein the evaluation unit is designed to detect the position in dependence on the first signal and the second signal, generated by the magnetic signal in the second conductor loop.

According to one preferred embodiment, at least one segment of the first conductor loop is essentially sine-shaped, relative to a reference position of the measuring path, and at least one segment of the second conductor loop is essentially cosine-shaped, relative to the reference position of the measuring path. As a result, an especially precise position detection is possible.

For a different advantageous embodiment, at least one conductor loop is embodied such that the size of a differential surface element of the at least one conductor loop changes along a coordinate axis of the measuring path in accordance with a specified function. As a result of the position signal generator being admitted with the periodic magnetic signal, the relevant conductor loop consequently has an induction voltage which depends on the size of the differential surface element, so that the position of the position signal generator can be deduced by evaluating, for example, the amplitude of the voltage signal induced in the conductor loop.

It should be noted that for some embodiments, the aforementioned function—at least for one conductor loop—can also be a constant, meaning independent of the position coordinate.

Insofar as the specifiable function determines a clear assignment of the size of the differential surface element of the viewed conductor loop to a corresponding position along the coordinate axis of the measuring path, the use of this one viewed conductor loop is already sufficient for a precise position determination according to one embodiment.

At least three conductor loops are provided for one preferred embodiment, wherein a function assigned to the first conductor loop is a sine function, wherein a function assigned to the second conductor loop is a cosine function, and wherein a function assigned to the third conductor loop is a constant. As a result of beaming the periodic magnetic signal of the position signal generator into the first conductor loop, a first induction voltage is advantageously generated which has a sine-shaped dependence on the position of the position signal generator while a corresponding cosine-shaped induction voltage appears in the second conductor loop. Based on the constant size of the differential surface element and independent of the position of the position signal generator and/or the magnetic signal transmitted therefrom, a voltage signal with constant envelope is induced in the third conductor loop, which can be used according to a preferred embodiment as reference signal for the evaluation.

An operating method for a position signal generator is disclosed in an embodiment.

An embodiment of the present invention is additionally solved with a method for operating a position measuring device. According to an especially preferred variant of this method, at least one conductor loop is embodied such that the size of a differential surface element of the at least one conductor loop changes along a coordinate axis of the measuring path in accordance with a specifiable function.

At least three conductor loops are provided for a different embodiment, wherein a function assigned to the first conductor loop is a sine function, wherein a function assigned to the second conductor loop is a cosine function, and wherein a function assigned to the third conductor loop is a constant, wherein the evaluation unit detects the position in dependence on the first signal and a second signal generated by the magnetic signal of the second conductor loop and a third signal generated by the magnetic signal in the third conductor loop.

For a different preferred embodiment, the second signal is phase-displaced by 90°, so as to obtain a phase-displaced second signal, and the first signal is added to the phase-displaced second signal to obtain a sum signal, wherein a phase comparison is realized between the sum signal and the third signal to detect the position.

With another preferred embodiment, the phase comparison comprises the following steps: converting the sum signal to a first digital signal, converting the third signal to a second digital signal, comparing the phases of the first and the second digital signal, in particular with the aid of a time measurement, to obtain the position. A particularly easy and efficient position detection is thus possible. In particular, detecting the phase displacement and/or realizing the phase comparison as proposed by the invention is possible with a highly precise time measurement, which can be carried out even with simple electronic components. According to one variant of the invention, converting the sum signal and/or the third signal to the corresponding digital signals can be realized efficiently and cheaply, for example by using comparators, especially Schmitt triggers.

BRIEF DESCRIPTION OF THE DRAWINGS

Additional features, use options and advantages of the invention follow from the description below of the exemplary embodiments of the invention, shown in the Figures. All described and shown features by themselves or in any combination form the subject matter of the invention, regardless of how they are combined in the patent claims or the references back, as well as independent of their formulation and/or representation in the description and/or the Figures.

Shown in the drawing are.

DETAILED DESCRIPTION OF THE EXAMPLE EMBODIMENTS

Figure 1:
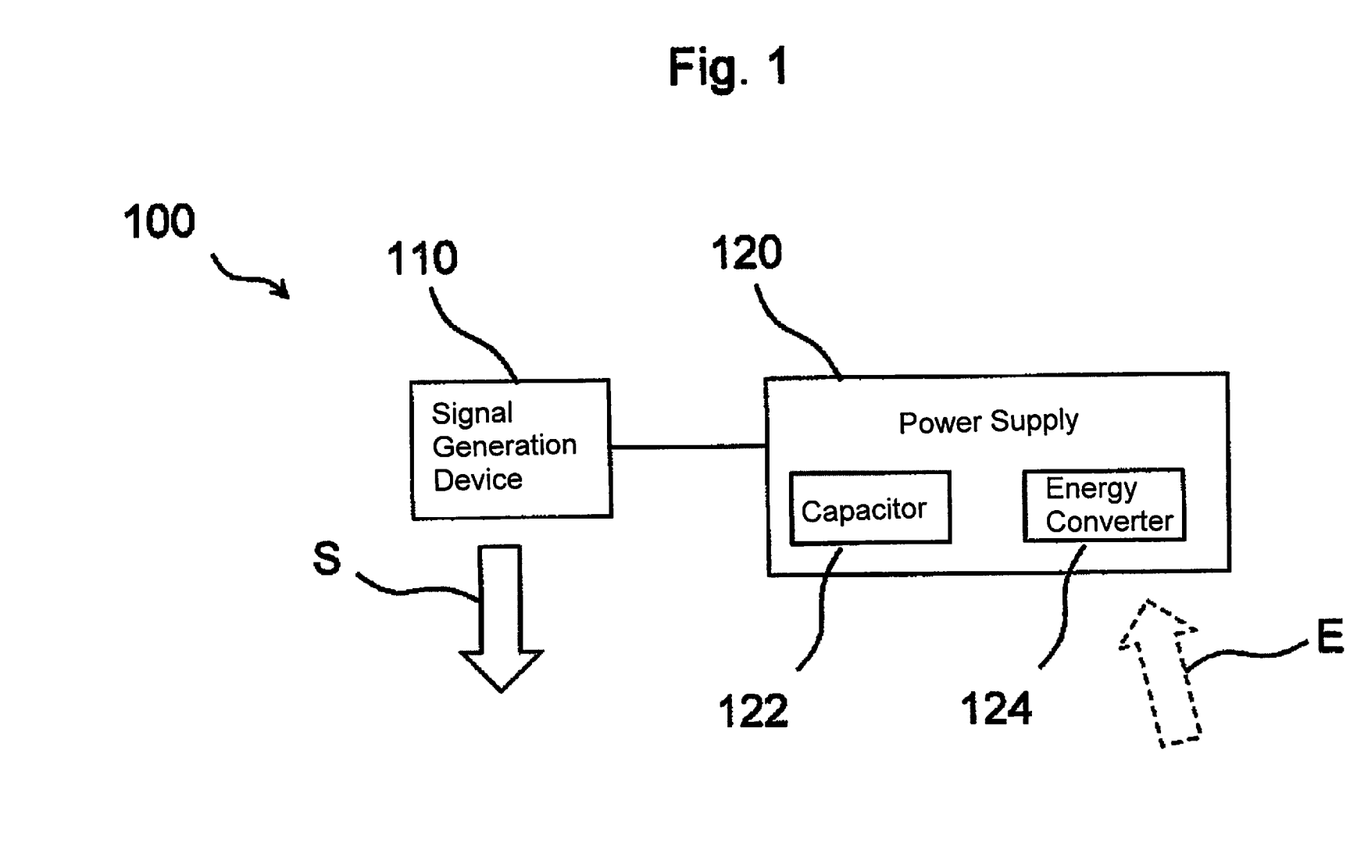
FIG. 1 A schematic block diagram of a position signal generator according to one embodiment.

FIG. 1 schematically shows a block diagram of the position signal generator 100 according to a first embodiment. The position signal generator 100 comprises a signal generation device 110 for generating a periodic magnetic signal S. The periodic magnetic signal S can couple into at least one measuring loop of a position measuring device to be described later on and can generate a corresponding induction signal therein which, when evaluated, allows detecting the position of the position signal generator 100.

The position signal generator 100 according to the invention furthermore comprises an electric power supply 120 for supplying the signal generation device 110 with electric power. An "active" position signal generator 100 is thus advantageously realized, meaning a position signal generator 100 which can itself actively generate the periodic magnetic signal S and, with a correspondingly large amplitude, can couple it into one or several measuring loops of a position measuring device. A particularly fast and precise position measuring is thus made possible.

According to one advantageous embodiment, the position signal generator 100 is provided with a preferably local energy storage 122. Embodying the local energy storage 122 as a capacitor is especially preferred. Alternatively or in addition, the electric power supply 120 can also comprise at least one energy converter 124 which is embodied to absorb energy E, supplied by an external unit (not shown) or generally by the environment surrounding the position signal generator 100, and to convert it at least partially into other types of energy, in particular to electric power. The energy E for the position transmitter 100 can be made available, for example, in the form of a magnetic induction field. In that case, the energy converter 124 is designed to convert at least a portion of the magnetic energy of the induction field into electric energy, in particular using the induction principle, so that the capacitor 122 can be charged using the energy received in this way.

The periodic magnetic signal S of one preferred embodiment has a frequency in the range of approximately 1 kHz to approximately 200 kHz, in particular ranging from approximately 10 kHz to approximately 20 kHz, which permits an especially precise position detection.

The energy converter 124 of another preferred embodiment of the invention is embodied to draw magnetic field energy from an induction field with a frequency of approximately 1 MHz (megahertz) to approximately 4 MHz, especially approximately 2 MHz. The different frequency ranges assigned to the signals S, E advantageously ensure that for the most part no mutual influencing occurs, especially no undesirable reactive effect of the inductive energy transfer E to the position signal generator 100, respectively the magnetic signal S generated by the signal generator for the position detection. Rather, an evaluation of the magnetic signal S and/or signals derived therefrom such as induction voltage signals, can involve a simple filtering, for example using a low-pass filter to eliminate "signal portions" of the induction field prior to the actual position evaluation.

Figure 2:
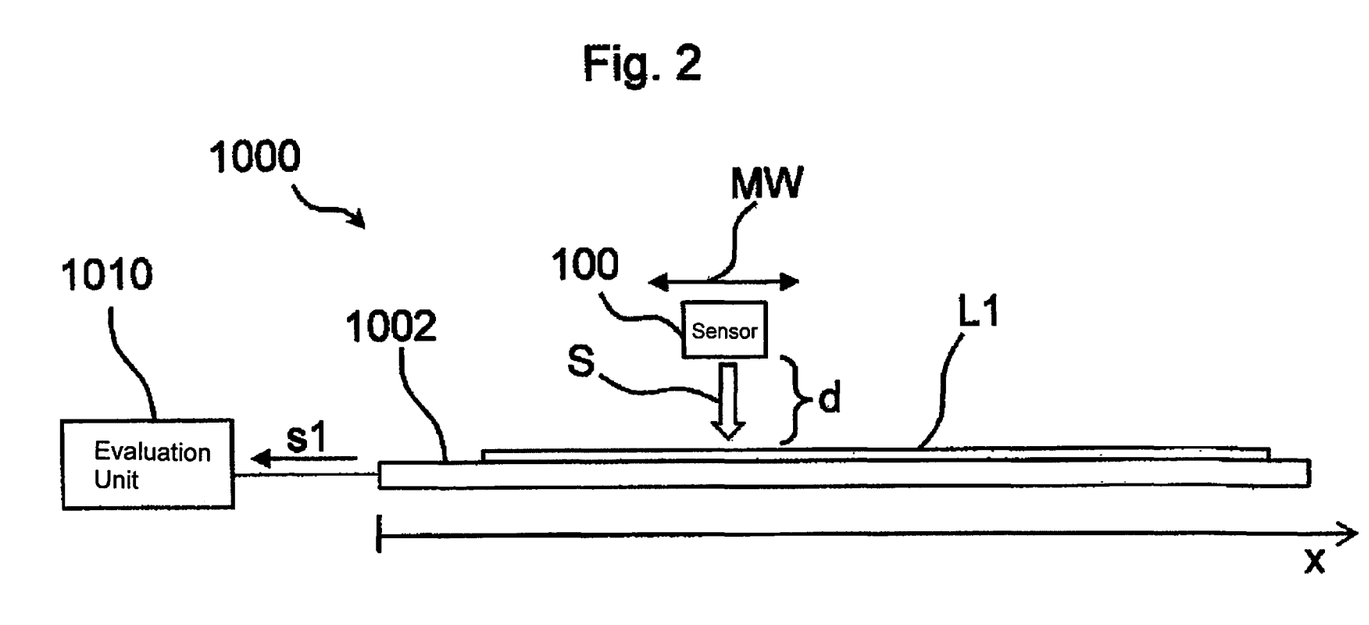
FIG. 2 A schematic view from the side of a position measuring device according to one embodiment.

FIG. 2 schematically shows a view from the side of a position measuring device 1000 according to one embodiment of the invention. The position measuring device 1000 comprises a first conductor loop L1 which extends along a position coordinate x and thus along a measuring path MW of the position signal generator 100, arranged in FIG. 2 above the first conductor loop L1. Especially preferred is the arrangement of the first conductor loop in a planar configuration on a support element 1002, for example a board material for producing electric circuit boards. Particularly advantageous is if the first conductor loop L1 and, if applicable, additional conductor loops (not shown in FIG. 2) are realized in the form of one or several conductor strips on the board material 1002.

A material such as FR4 or even a ceramic material or the like can be considered for the board material. Different embodiments can conceivably also contain flexible film conductors for holding one or several conductor loops, thus providing further degrees of freedom for the embodiment of the measuring path MW.

FIG. 2 shows that the position signal generator 100 transmits the periodic magnetic signal S it generates in the direction of the first conductor loop L1, thus resulting in a first signal s1 in the conductor loop L1 because of induction effects, which can then be evaluated by the evaluation unit 1010 for detecting the position x of the position signal generator 100.

The vertical distance d (FIG. 2) of a particularly preferred configuration between the position signal generator 100 and/or its signal generation device 110 (FIG. 1) and the plane for the conductor loop L1 is a few millimeters, for example ranging from approximately 0 mm to approximately 20 mm, preferably between about 0.1 mm and 10 mm.

For some embodiments, the support element 1002 with thereon arranged first conductor loop L1 can also have a casing (not shown herein), wherein at least in the region of the conductor loop L1 and/or along the measuring path MW a material must be selected for the casing which allows the magnetic signal S from the position signal generator 100 to pass through the casing to the first conductor loop L1.

With other embodiments, the position signal generator 100 can also be arranged sliding directly on a surface of the conductor loop L1 and/or the support element. In that case, the position signal generator 100 and/or its signal generation device 110 and/or the conductor loop L1 can be provided with a corresponding sliding layer (not shown) which is advantageously embodied electrically insulating to prevent a galvanic contact between the signal generation device 110 and the conductor loop L1.

Figure 3:
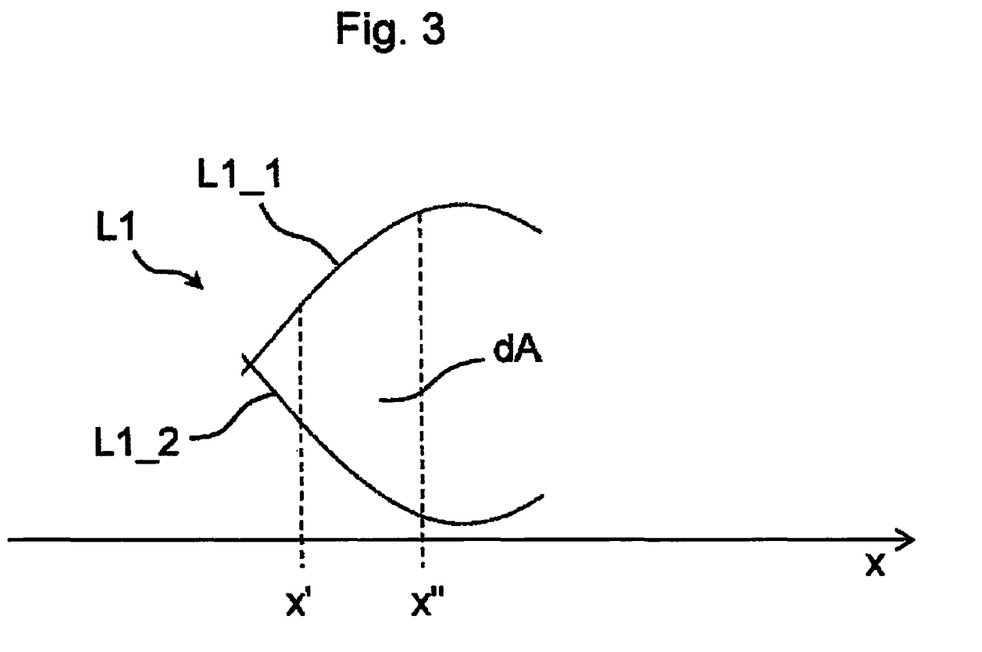
FIG. 3 A diagram showing a segment of a conductor loop according to one embodiment.

For an especially preferred embodiment, at least one conductor loop L1 of the position measuring device 1000 is embodied such that the size of a differential surface element of the at least one conductor loop L1 changes along a coordinate axis x of the measuring path MW in accordance with a specifiable function. In this connection, FIG. 3 schematically shows a segment of an exemplary embodiment of a first conductor loop L1 which extends along the coordinate axis x. As can be seen in FIG. 3, a first segment L1_1 of the first conductor loop L1 is essentially sine-shaped (proportional sine(x)), relative to an imagined parallel axis to the coordinate axis x (not shown), while the second segment L1_2 is essentially negative sine-shaped (e.g., proportional −sine(x)), relative to the same axis. A size consequently results for the viewed differential surface element dA of FIG. 3, which depends on the value of the sine function in the range of support locations x', x", as well as the generally constant interval width x"−x'. According to one embodiment of the invention, owing to the known connection between the position coordinate x and the specifiable function, a sine function in the present case, it is possible to deduce the position x for the location of the position signal generator 100, based on the amplitude of the first signal s1, which is an induction voltage signal and is induced in the first conductor loop L1 as a result of the magnetic signal S. For other positions x, the differential surface element has other values corresponding to the sine-shaped course of the first conductor loop L1, viewed as example, which consequently lead to other signal amplitudes for the first signal s1.

Figure 4:
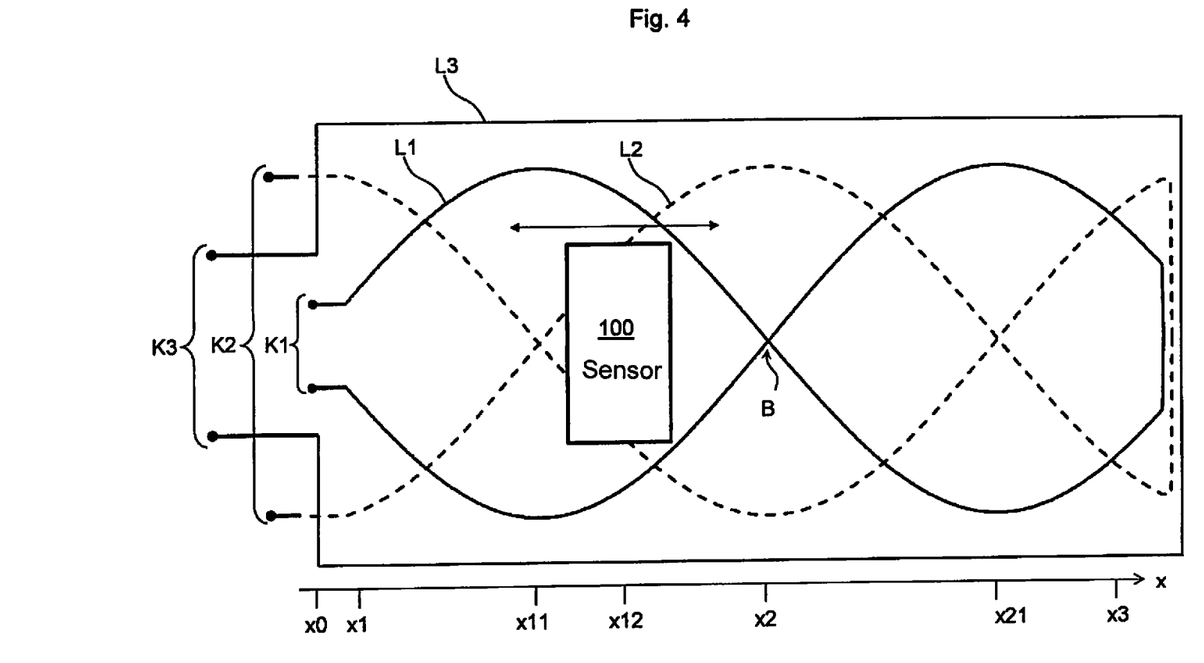
FIG. 4 A schematic view from the top of a conductor loop in a position measuring device according to one embodiment.

FIG. 4 shows a further embodiment of the invention. Shown is a view from above of a schematic conductor loop arrangement for the position measuring device according to one embodiment.

A first conductor loop L1 has an essentially sine-shaped form, relative to the reference position x0. Said more precisely, the first conductor loop L1 comprises—analogous to FIG. 3—two segments which are not shown further in FIG. 4, of which the first segment has a positive sine shape, relative to the reference position x0, and the second segment has a negative sine shape, relative to the reference position x0. In the region B (position coordinate x2), the two segments cross without being connected galvanically while in the region of the position coordinate x3, the first conductor loop L1 is closed by an essentially vertically extending segment, as shown in FIG. 4, thus deviating from the sine shape.

In contrast, a second conductor loop L2, shown in FIG. 4 with a dashed line for reasons of clarity has a cosine shape as compared to the reference position x0. For its individual segments which are also not shown in further detail, the same applies as explained in the above for the first conductor loop L1, wherein crossings of these segments occur in the region of the position coordinates x11, x21.

The two conductor loops L1, L2 are surrounded by a third conductor loop L3, having an essentially rectangular shape and thus a constant variable for the aforementioned differential surface element, described with reference to FIG. 3.

The position signal generator 100 according to one embodiment is furthermore shown in FIG. 4. The position signal generator can be moved along the position coordinate x and/or the measuring path (see the double arrow without reference) over the conductor loops L1, L2, L3. A support element 1002, as shown in FIG. 2, is not shown in FIG. 4 for reasons of clarity, but can be embodied as a board, in particular a board with multiple layers (multilayer board), wherein individual segments of the conductor loops L1, L2, L3 can respectively extend over one or several layers which are interconnected in a manner known per se, for example via feedthrough contacts (English: "vias"=vertical interconnected access).

The terminals K1 are assigned to the first conductor loop L1, the terminals K2 are assigned to the second conductor loop L2 and the terminals K3 are assigned to the third conductor loop L3.

In order to detect the position x of the position signal generator 100, the position signal generator 100 with the aid of the signal generation device 110 (FIG. 1) generates in the previously described manner a periodic magnetic signal S (FIG. 2), for example having a frequency of approximately 10 KHz. This can be achieved by admitting a magnetic coil (not shown) of the position signal generator 100 with an electric signal of the corresponding frequency. Owing to the resulting current flux through the coil, a magnetic field with the same frequency is generated in a known manner. The electric signal can be generated, for example, with the aid of the previously described oscillator.

According to FIG. 4, this type of signal generator 100 operation results in a corresponding induction voltage to be generated in all three conductor loops L1, L2, L3, based on the induction law, wherein this the voltage is also referred to as first and/or second and/or third signal for the further description. The first signal corresponds accordingly to the induction voltage in the first conductor loop L1, such as can be tapped at the terminals K1 of the first conductor loop L1. The second signal corresponds to the induction voltage present at the terminals K2 of the second conductor loop L2, and the third signal corresponds to the induction voltage present at the terminals K3 of the third conductor loop L3.

While the first and second signals of the first and second conductor loop L1, L2 respectively have a position-dependent amplitude and/or an envelope curve, the third signal present at the terminals K3 does not have a position-dependent, but a constant amplitude since essentially the same magnetic flux moves through the third conductor loop L3 for all possible positions x of the position signal generator 100.

As can be seen from FIG. 4, the terminals K1, K2, K3 are arranged near the position coordinate x0 while the sensibly useful measuring path extends between the position coordinates x>x1, x<x3. Owing to the deviation of the shape of the conductor loops L1, L2 from the ideal shape in the region of the position coordinates x<x1, x>x3, it recommends itself to correspondingly limit the measuring path.

According to a variant of the inventive method, for example, the position signal generator 100 can generate a periodic, magnetic signal S in such a way that an induction voltage adjusts in the third conductor loop L3 as reference signal s3, based on the following equation:

$$s3 = U \cdot \sin(\omega \cdot t),$$

wherein $\omega = 2 \cdot \pi \cdot 10$ kHz, wherein U represents a peak amplitude of the induction voltage which depends, for example in a manner known per se, on the amplitude of the magnetic signal S and on the distance between the position signal generator 100 and/or its signal generation device 110 (FIG. 1) from the plane for the third conductor loop L3. The signal s3, obtained in this way, preferably serves as a reference signal for an evaluation of the additional signals s1, s2, within the meaning of determining the position x12 of the position signal generator 100.

For the first signal at the terminals K1 of the first conductor loop L1, a signal is obtained according to the present equation for the present embodiment:

$$s1 = U \cdot \sin(\omega \cdot t) \cdot \sin(x)$$

Analogous thereto, it follows for the second signal of the second conductor loop L2:

$$s2 = U \cdot \sin(\omega \cdot t) \cdot \cos(x)$$

With an especially preferred embodiment, the second signal s2, obtained from the conductor loop L2, is subjected to a phase displacement by 90° for the position detection, thereby resulting in a phase-displaced second signal s2' according to the following equation:

$$s2' = U \cdot \sin(\omega \cdot t + 90°) \cdot \cos(x) = U \cdot \cos(\omega \cdot t) \cdot \cos(x).$$

Adding the phase-displaced second signal s2' to the first signal leads to the sum signal s4:

$$s4 = U \cdot \sin(\omega \cdot t) \cdot \sin(x) + U \cdot \cos(\omega \cdot t) \cdot \cos(x) = U \cdot \cos(\omega \cdot t - x).$$

The sum signal s4 obtained with the above equation is then subjected to a phase comparison with the reference signal s3, wherein the position x follows from the phase difference, for the present case x=x12.

The above-described evaluation is particularly advantageous since the phase comparison can be realized with extremely high precision and relatively low complexity.

A particularly preferred embodiment provides that for the phase comparison the sum signal s4 is converted to a first digital signal, and that the third signal s3, meaning the reference signal, is converted to a second digital signal which can be realized, for example, with comparators or Schmitt triggers. The comparison between the phases of the first and the second digital signal in that case can advantageously be realized with a time measurement.

For example, a first point in time T1 can be defined as point in time where a positive flank of the first digital signal appears, while a second point in time T2>T1 is defined as point in time when a positive flank first appears for the second digital signal. In that case, the time different T2−T1 is directly proportional to the phase difference between the viewed digital signals, so that the phase difference can be determined from this time difference and, finally, from this the actual position x12 of the position signal generator 100.

Since highly precise counters are available for the time measurement in the kHz range (millisecond range and/or microsecond range), even with comparably simple microcontrollers or digital signal processors (DSP), a corresponding evaluation unit 1010 (FIG. 2) can be made available very cheaply for the position measuring device 1000, without having to forego the especially high precision made possible by the active position signal generator 100 according to the invention.

The evaluation unit 1010 for an embodiment can generally comprise an arithmetic unit for realizing the above-described method. The arithmetic unit can be embodied, for example, as microcontroller or as digital signal processor. Providing an ASIC (application specific integrated circuit) or an FPGA (field programmable gate array) is also conceivable.

Mechanisms that are known per se, for example timer interrupts or the like in known microcontrollers, are especially preferred for implementing the time measurement of additional embodiments. Alternatively or in addition, the use of discrete counting device components (e.g. CMOS HC 4020) or time measuring components (TDC—time to digital converters) can be considered.

As an alternative to the above-described evaluation, it is also conceivable to evaluate the analog signals s1, s2 and/or s3 directly with the aid of a microcontroller or an arithmetic unit of a different type. For example, it is conceivable to scan the signals s1, s2, s3 with a sufficiently high scanning rate, which should be noticeably higher than the frequency of the periodic signal S, and to convert these to digital signals. The amplitudes and/or the phase difference can subsequently be evaluated by the microcontroller, as described in the above.

For a different advantageous embodiment, it is also possible to provide only a single conductor loop L1. In that case, the position is determined using a clear connection between the amplitude of the induction voltage signal s1 of the single conductor loop L1 and the position x. To ensure a correspondingly large unambiguousness range, the geometry of the viewed conductor loop L1 accordingly must be selected such that the viewed measuring path MW contains maximally one sine wave and/or only a half-wave.

Figure 5A:
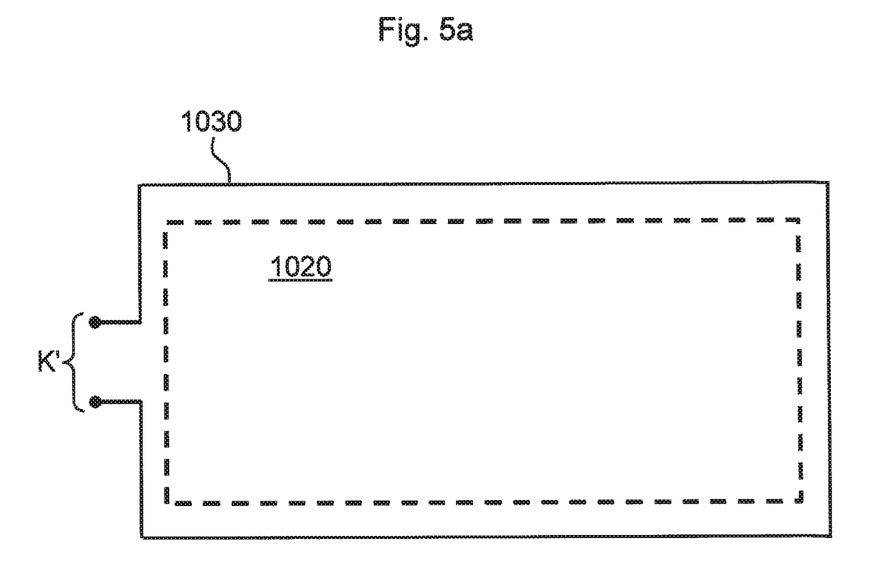
FIGS. 5a, 5b Respective schematic aspects of the inductive power supply of the position signal generator according to additional embodiments.

FIG. 5a shows a further embodiment of the invention. Shown is a schematic view from the top of the circuit board arrangement according to FIG. 4, which for the present case is indicated by a dashed rectangle and the reference number 1020 and in detail contains the three conductor loops L1, L2, L3, as shown in FIG. 4.

A further conductor loop 1030 is arranged around the arrangement 1020 which, for the present case, has only one winding, but can also have several windings for a preferred embodiment. The terminals K' of the conductor loop 1030 are admitted with an electric signal which preferably has a frequency of approximately 1 MHz or more, so as to make available an induction field with the corresponding frequency. In this way, a position signal generator 100 (FIG. 2) that is arranged within the area of the conductor loop arrangement 1020 and thus also within the further conductor loop 1030 can be provided with energy via the electromagnetic induction through the fourth conductor loop 1030 for operating its oscillator and/or its signal generation device 110. Since the induction loop 1030 is preferably operated with frequencies of 1 MHz or more, an efficient power supply is possible for the position signal generator 100 and it is simultaneously and advantageously ensured that the measuring operation is not disturbed which takes place in the kHz range using the magnetic signal S.

If applicable, the evaluation unit 1010 (FIG. 2) for one embodiment can carry out a low-pass filtering of the signals s1 and/or s2 and/or s3 prior to the actual position detection, so as to ensure that the relatively high-frequency induction signals do not enter into the position detection. The low-pass filtering can be analogous and/or digital, depending on the evaluation principle, but is carried out analogous for an especially preferred embodiment and is combined with the position detection through phase comparison, as described in the above.

Figure 5B:
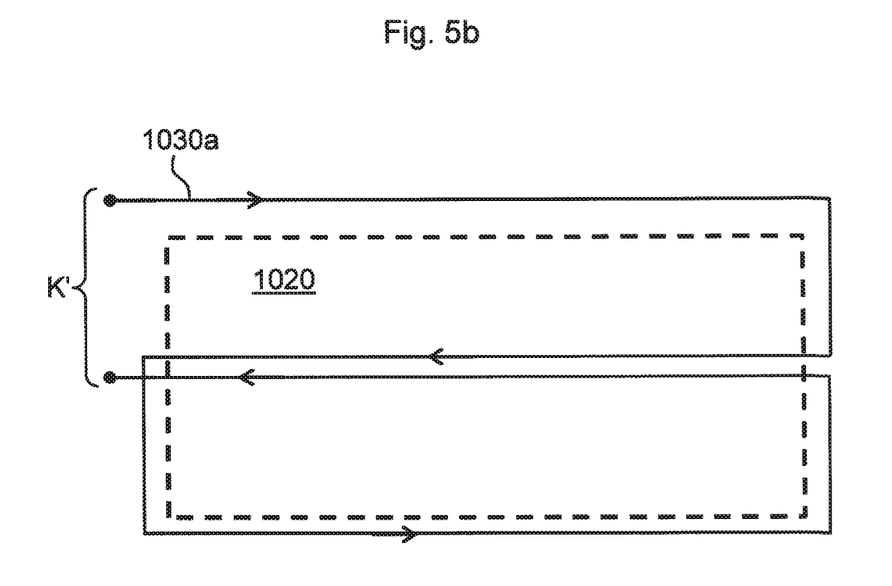

FIG. 5b shows a further preferred variant of the induction coil 1030a for supplying the position signal generator 100 with energy. In contrast to the variant according to FIG. 5a, the conductor loop 1030a in FIG. 5b has a modified topology which causes a reduction of the magnetic fields around the conductor loop 1030a ("field balancing").

Figure 6:
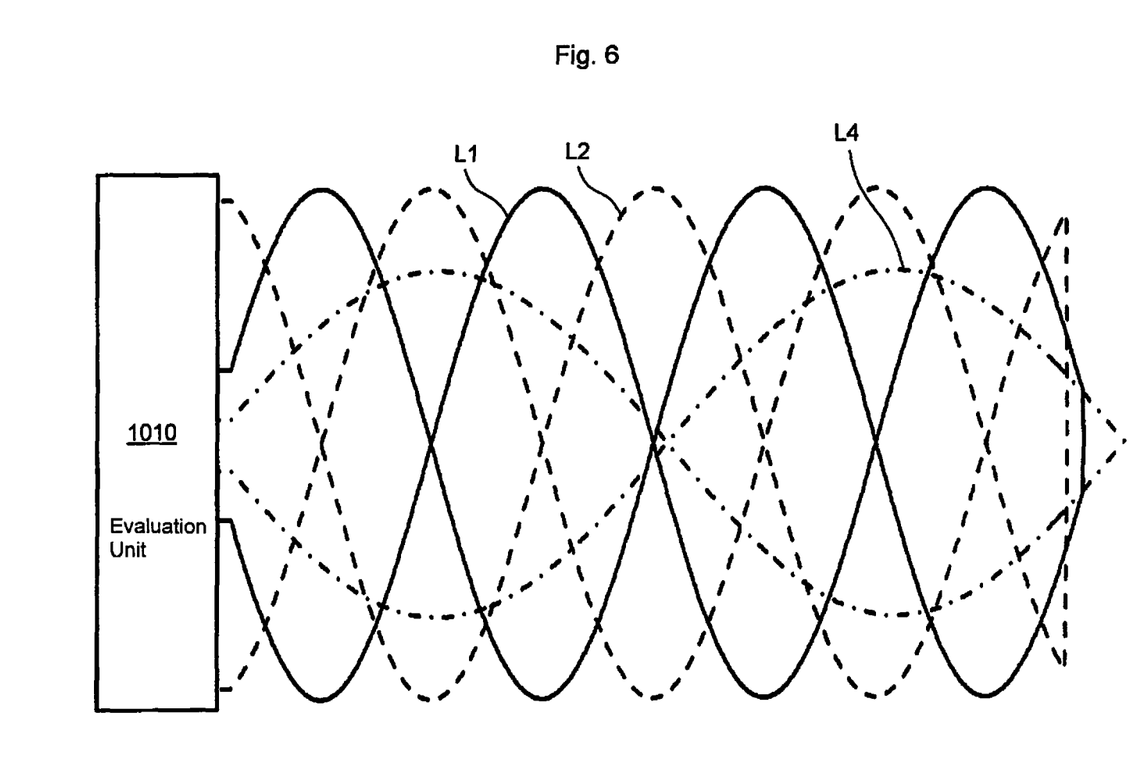
FIG. 6 Schematic views of conductor loops in a position measuring device according to yet another embodiment.

FIG. 6 schematically shows a conductor loop arrangement according to another embodiment. On the whole, three conductor loops L1, L2, L4 are imaged, wherein the conductor loops L1, L2 essentially correspond to the conductor loops L1, L2 shown in FIG. 4. The third conductor loop L4 shown in FIG. 6 has a sine-shaped geometry along the position coordinate x (FIG. 4), similarly to the conductor loop L1 in FIG. 6, relative to the connecting location of the evaluation unit 1010 (FIG. 6), but has a longer periodic interval and/or wavelength. The signal induced in the third conductor loop L4 therefore can advantageously be used by the evaluation unit 1010 to clearly make a rough determination of the position of the position signal generator (not shown in FIG. 6). The position value obtained in this way can be refined by evaluating the signals from the conductor loops L1, L2 according to the above-described principle.

Optionally, the arrangement according to FIG. 6 can also be provided with an additional conductor loop having a rectangular shape, similarly to the conductor loop L3 in FIG. 4, for the purpose of making available a reference signal. The embodiments according to FIGS. 4, 5a, 5b, 6 can also be combined.

Figure 7:
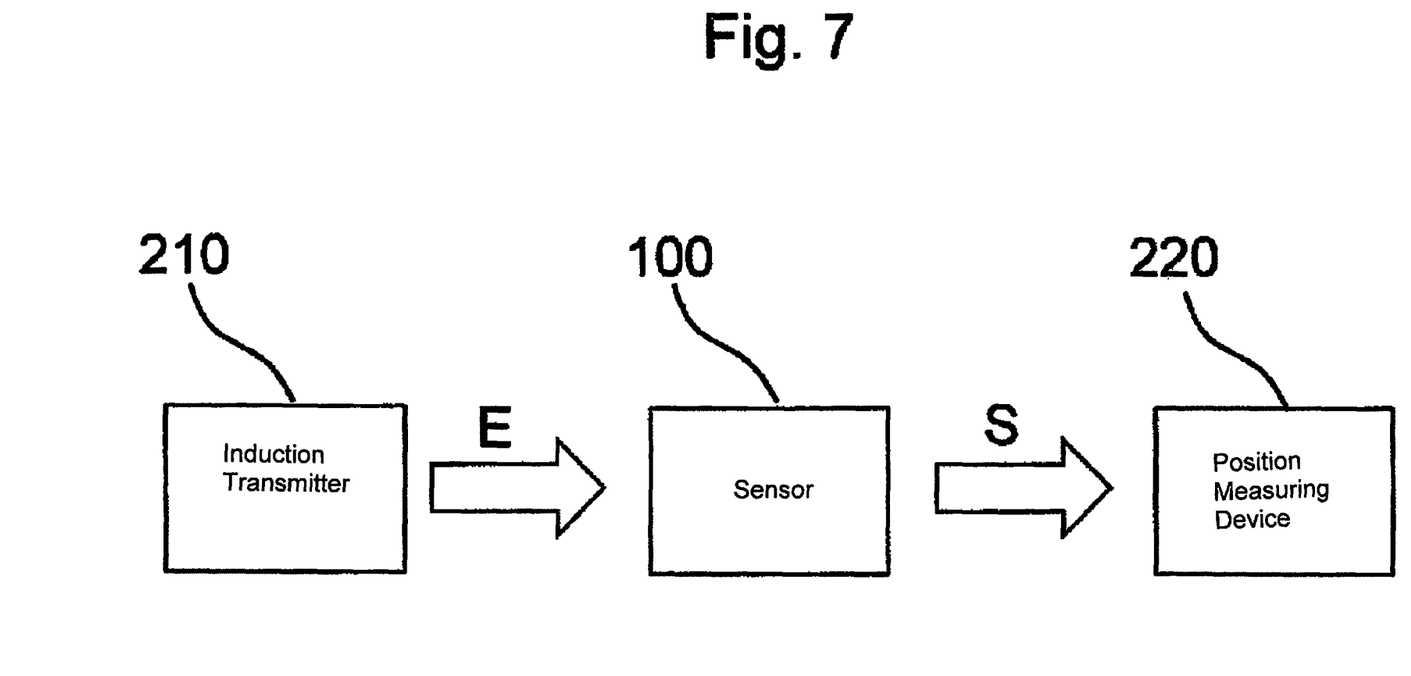
FIG. 7 A simplified schematic block diagram for one embodiment.

FIG. 7 shows a simplified block diagram for illustrating the principle according to the invention. Block 210 represents an "induction transmitter" for making available the induction field described in the above with reference to FIGS. 5a, 5b, for example with a frequency of approximately 1 MHz, so as to supply the active position signal generator 100 with energy E in this way. In turn, the active position signal generator 100 using the supplied energy E generates a relatively low-frequency (frequency range approximately 1 kHz to approximately 200 kHz) periodic magnetic signal S that is beamed into a conductor loop arrangement of a position measuring device, which for the present purpose is illustrated with the block 220.

Via the electromagnetic induction with a frequency of approximately 1 MHz the position signal generator 100 is advantageously supplied with energy to ensure the electrical supply of the position signal generator 100, and the magnetic signal S for the actual position detection is preferably generated at a frequency in the kHz range, so that during the following evaluation with the evaluation unit 1010, the signals of interest can reliably be separated with a simple filtering operation from possibly occurring interferences and/or the induction signal 1.

Figure 8:
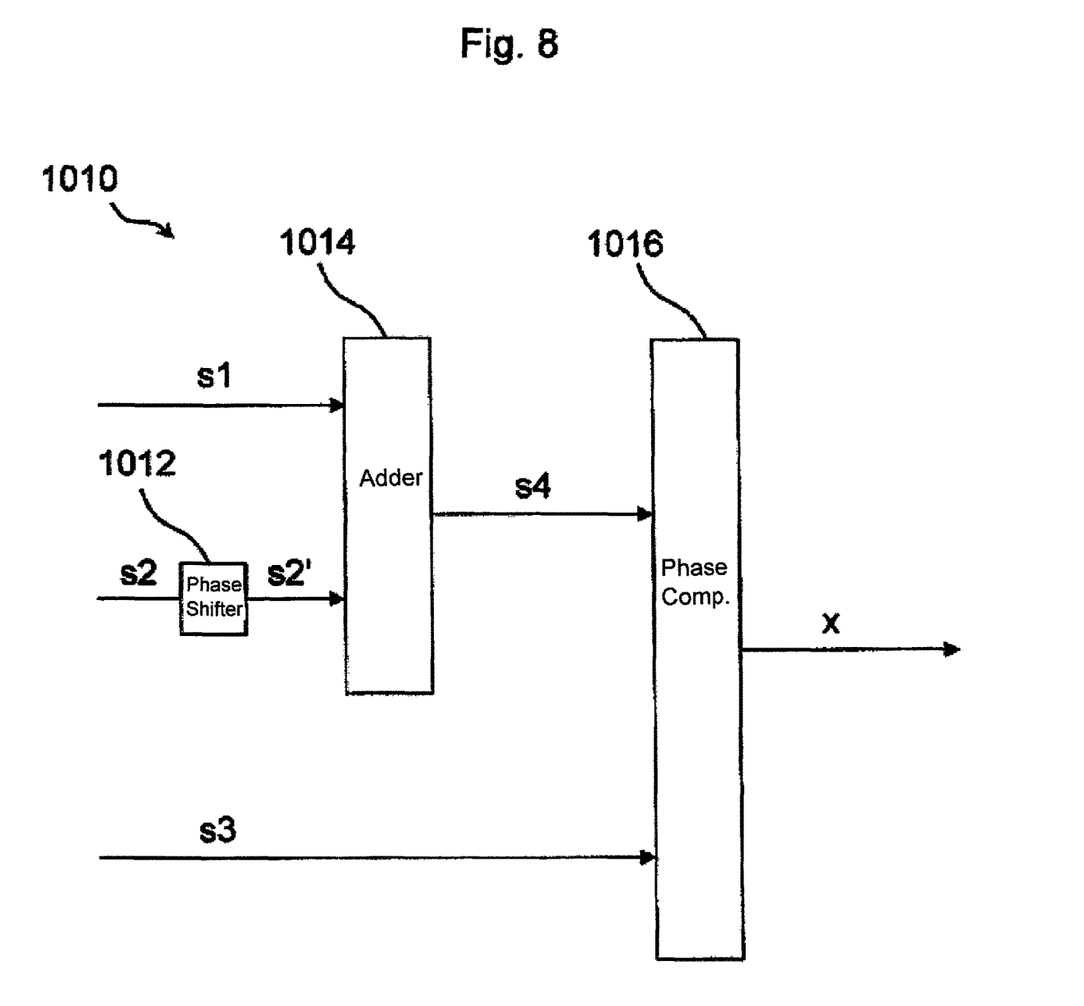
FIG. 8 A schematic block diagram of a variant of the method according to the invention.

FIG. 8 schematically shows a block diagram for the position detection with an evaluation unit 1010 according to one embodiment, for example using the conductor loop arrangement according to FIG. 4. The first signal s1, obtained from the first conductor loop L1, is supplied to the adder 1014. The second signal s2 coming from the second conductor loop L2 is initially displaced by 90° via the phase shifter 1012, thus providing the phase-displaced signal s2' which is then also supplied to the adder 1014. The adder 1014 forms a sum signal s4 from the two signals s1, s2' which, in the same way as the reference signal s3 in the third conductor loop L3, is supplied to the phase comparator 1016 which detects the position x of the position signal generator 100 from the phase difference between the signals s3, s4.

The active position signal generator 100 according to the invention advantageously allows generating relatively strong magnetic signals S which are coupled into one or several measuring loops L1, L2, . . . of the position measuring device 1000, thus making possible an increased sensitivity and a higher position resolution. The configuration according to the invention also allows achieving a higher dynamic for a total system 1000 containing the position signal generator 100, so that a faster detection of the position values x is possible than with conventional systems and a higher detection rate can be realized.

For embodiments of the position signal generator 100 provided with an oscillator, the following steps can be realized prior to a position detection so as to effect a reliable startup of the oscillator: As described, for example, with reference to FIGS. 5a, 5b, the position signal generator 100 can be supplied with energy for operating the oscillator via the induction coil 1030, 1030a. In addition, one of the conductor loops L1, L2, L3 of the position measuring device 1000, for example, can be admitted with a periodic signal by the evaluation unit 1010 or a separate signal generator (not shown) which signal essentially has the same frequency as the oscillator for the position signal generator. Owing to the inductive coupling between the conductor loop L1, L2, L3, now functioning as "transmitting loop," and the oscillator, a startup of the oscillator is facilitated. As soon as the oscillator has started, there is no longer a need for the evaluation unit 1010 or the separate signal generator to admit the conductor loops L1, L2, L3, and the actual position measuring operation can start for which the conductor loops L1, L2, L3 operate as receiving loops.

According to a different embodiment, at least one conductor loop L1 can have a geometry that differs from the sine shape and/or the cosine shape as function of the position coordinate x, for example a triangular geometry. Other forms, "clearly locally conditioned," for the conductor loops are also conceivable. It is furthermore possible through a spatial nesting of several conductor loops which are themselves not sine-shaped and, in particular, a variation of their geometric expansion perpendicular to the position coordinate x to obtain a sine-shaped and/or cosine-shaped dependence of the magnetic coupling between the position signal generator and the respective conductor loop on the position coordinate x.

The measuring path MW (FIG. 2) of another embodiment can be straight (in particular one-dimensional). With different embodiments, a curved course of the measuring path is also conceivable, for example two-dimensional or three-dimensional.

The invention provides an advantageous inductive measuring principle, as well as an inductive position signal generator and an inductive position measuring device.

The invention claimed is:

1. A position signal generator for an electronic position measuring device, the position signal generator comprising:
   a signal generation device to generate a periodic magnetic signal;
   an electric power supply device to supply the signal generation device with electric power;

at least one local energy storage; and an energy converter with a receiver coil to receive energy from an induction field, wherein the electric power supply device has a rectifier to charge the at least one local energy storage with a direct voltage, the position signal generator is configured to rectify a voltage induced in the receiver coil via the rectifier and is configured to charge the at least one local energy storage with the direct voltage generated by the rectifier, the signal generation device has at least one active oscillator which, for energy supply, receives the direct voltage from the at least one local energy storage as an input voltage, the signal generation device being configured to actively generate the periodic magnetic signal in the position signal generator.

2. The position signal generator of claim 1, wherein the electric power supply device includes the at least one local energy storage.

3. The position signal generator of claim 1, wherein the electric power supply device includes the energy converter, the energy converter configured to convert at least one of mechanical energy, thermal energy, radiation energy and energy tapped from at least one of a magnetic and electric field, into electric power.

4. The position signal generator of claim 1, wherein the periodic signal has a frequency component in the range of approximately one kilohertz to approximately 200 kilohertz.

5. The position signal generator of claim 1, wherein the at least one local energy storage includes at least one of a capacitor, a battery and an accumulator.

6. The position signal generator of claim 1, wherein the periodic signal has a frequency component in the range of approximately 10 kilohertz to approximately 20 kilohertz.

7. A position measuring device for detecting a position of the position signal generator of claim 1, movable along a measuring path comprising:

at least one conductor loop, arranged along the measuring path, to detect the periodic magnetic signal generated by the position signal generator, the at least one conductor loop being embodied such that a magnetic coupling between the signal generation device of the position signal generator and the at least one conductor loop is configured to change in dependence on the position of the position signal generator; and an evaluation unit to detect the position in dependence on a first signal, generated from the magnetic signal in the at least one conductor loop.

8. A method for operating a position signal generator for an electronic position measuring device, comprising:

generating a periodic magnetic signal via a signal generation device; and supplying, via an electronic power supply device, the signal generation device with electric power, wherein the position signal generator has at least one local energy storage, and an energy converter with a receiver coil to receive energy from an induction field, wherein the electric power supply device has a rectifier to charge the at least one local energy storage with a direct voltage, wherein the position signal generator rectifies a voltage induced in the receiver coil via the rectifier and charges the at least one local energy storage with the direct voltage generated by the rectifier, and wherein the signal generation device has at least one active oscillator which, for energy supply, receives the direct voltage from the at least one local energy storage as an input voltage, and actively generates the periodic magnetic signal in the position signal generator.

9. The method of claim 8, further comprising:

converting, via the energy converter, at least one of mechanical energy, thermal energy, radiation energy and energy tapped from at least one of a magnetic and electric field into energy; and storing the energy, at least at times, in the at least one local energy storage.

\* \* \* \* \*